Dec. 18, 1945.   C. E. HATHORN   2,391,235
HOSE CLAMP
Filed Feb. 15, 1943
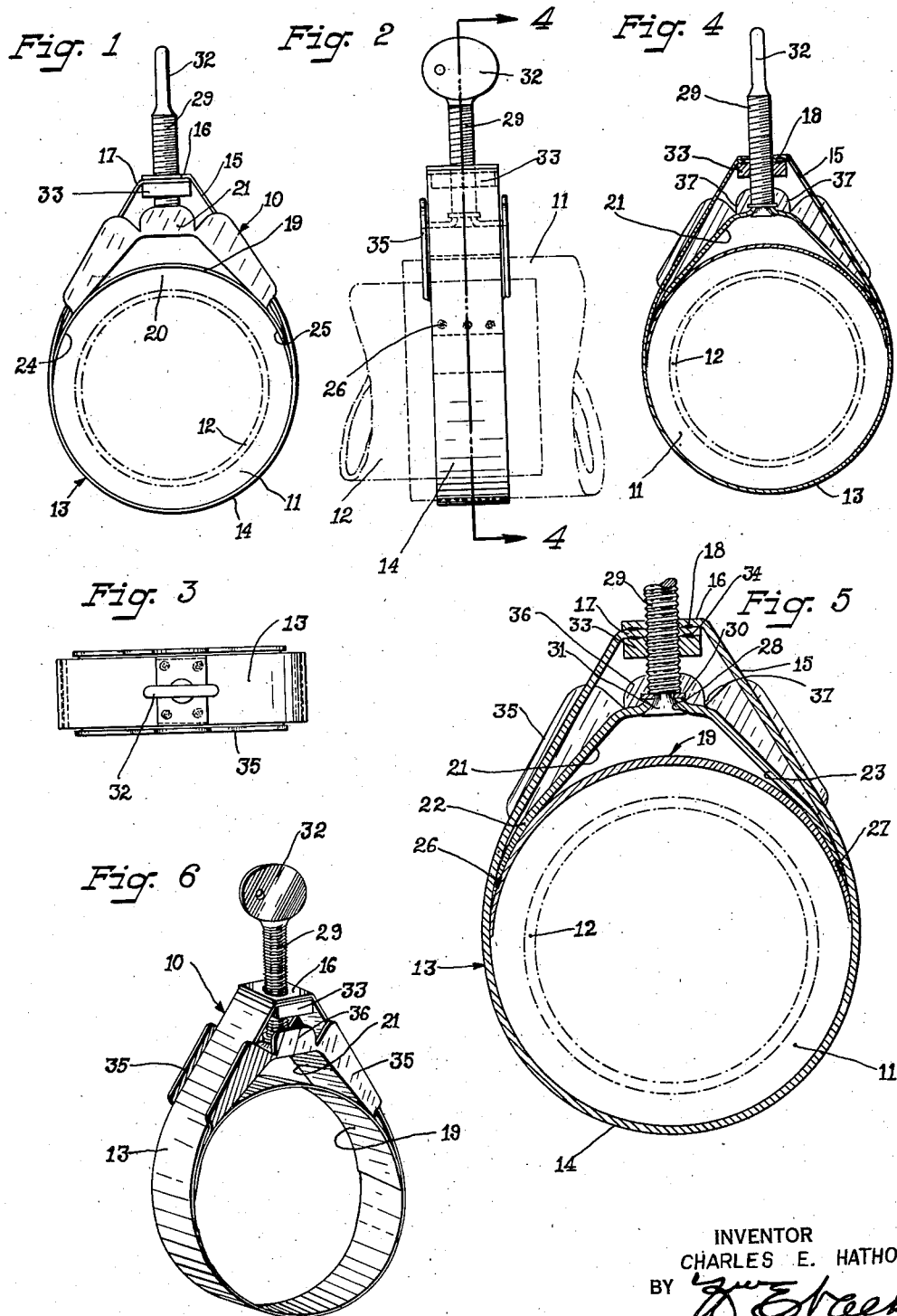
INVENTOR
CHARLES E. HATHORN
BY
ATTORNEY Patented Dec. 18, 1945

2,391,235

UNITED STATES PATENT OFFICE 2,391,235

HOSE CLAMP

Charles E. Hathorn, Kenmore, N. Y., assignor to Curtiss-Wright Corporation, a corporation of Delaware Application February 15, 1943, Serial No. 476,016

9 Claims. (Cl. 24—19)

This invention relates to hose clamps and more particularly to hose clamps of two-part construction.

Heretofore, hose clamps of this type having a primary band adapted to entirely surround the hose and a secondary or clamping band or plate adapted to lie within the primary band have not provided an efficient means for the clamping of a flexible hose to a rigid metal pipe. With such an arrangement, only the primary band was placed in tension while the secondary band adapted to cooperate with the primary band functioned merely as a locking screw, leaving the secondary band only in contact with the hose at the point of maximum pressure on the secondary band. This point of pressure, when a single set screw is used, was in the middle of the plate and the ends of the secondary band flexed upwardly and failed to serve the clamp to clamp the hose in regions adjacent the ends of this secondary clamping plate.

It is, therefore, the object of the present invention to provide a clamp of the two-part construction wherein the secondary band or clamping plate, forming a part of the clamp, is placed in circumferential tension when the clamp is tightened about the hose along with the primary band and to thereby equally distribute the holding pressure about the circumference of the hose.

It is another object of the present invention to provide with this type of hose clamp means wherein the second clamping plate will be accurately guided into its clamping position whereby it cannot be easily dislocated longitudinally of the primary band along the hose.

According to the present invention the primary band is similar to that used heretofore. It has a portion which fits snugly about a portion of the hose and a second portion spaced from the circumference of the hose within the latter of which is disposed the clamping plate adapted to fit over the remaining portion of the hose. This second clamping plate is semi-circular in shape and has end portions tending to be guided by the primary band into fitting engagement about the hose and to thereby provide a completed band extending entirely around the hose circumference. To these end portions of the clamping plate is connected a bridging element, which in turn receives a thrust from a thumb screw threaded in a nut carried by the spaced portion of the primary band. As the thumb screw is turned, pressure is applied simultaneously at both ends of the clamping plate and hence at points removed from the middle of the plate whereby the secondary plate is placed in tension as the thumb screw is turned and the clamp is fastened about the hose. This bridging element also carries projections to serve as guides for the proper axial alignment of the secondary clamping plate with respect to the primary band.

For other objects and for a better understanding of the invention, reference should be had to the following detail description taken in connection with the accompanying drawing, in which Fig. 1 is an end view, in elevation, of the hose clamp embodying the features of the present invention.

Fig. 2 is a side elevational view of the hose clamp, illustrating the manner in which it surrounds the hose for effecting clamping action of the hose upon a rigid pipe.

Fig. 3 is a top plan view of the clamp.

Fig. 4 is a sectional view of the clamp taken along the line 4—4 and looking in the direction of the arrows thereof.

Fig. 5 is a view similar to Fig. 4, only enlarged to show up more clearly the details.

Fig. 6 is a perspective view of the clamp separated from the hose.

Referring now to the figures, there is shown a hose clamp 10 embodying the features of the present invention and adapted to engage a flexible hose 11 to retain the same about a pipe 12. This hose clamp includes a primary band 13 having a portion 14 adapted to fit snugly about a part of circumference of the hose 11, and a second portion 15 adapted, when disposed over the hose, to be spaced from the circumference of the same. The band 14 is made of a single piece of strap with ends 16 and 17 adapted to be overlapped and welded together as indicated at 18 in Fig. 5. It will be noted that this primary band 14 completely surrounds the hose 11 but has the portion 15 spaced from the circumference of the hose.

Arranged to fit within the primary band 14 and adapted to be adjustable in the space provided between the space portion 15 of the band and the circumference of the hose, is a secondary band or clamping plate 19 of semi-circular shape and adapted to fit over a top portion 20 of the circumference of the hose 11. This clamping plate 19 finally completes the contact of the clamp about the hose 11 so that there is substantially a complete band about the hose.

In back of the clamping plate 19 is a bridging element 21. This bridging or outer thrust transmitting element 21 has ends 22 and 23 which are weldingly secured to end portions 24 and 25 of the clamping plate 19. The welding of these portions is best indicated respectively at 26 and 27 in Fig. 5. Within the top portion of the bridging element is an opening 28 into which there is extended the end of a tightening screw 29. This tightening screw 29 fits within a washer element 30 and is secured within the opening 28 by the fact that it is upset or flared as indicated at 31. The adjusting screw 29 has a thumb turning portion 32. The adjusting screw 29 is threaded into a nut 33 which is welded to the ends 16 and 17 of the band 14 as best indicated at 34, Fig. 5. As the adjusting screw 29 is turned, it will move inwardly or outwardly depending upon whether the clamping plate is to be tightened or untightened about the hose.

Assuming that the screw 29 is turned to effect the clamping action, the force is transmitted from the bridging element to the end portions 24 and 25 of the clamping plate 19 so that as this takes place the clamping plate 19 will be virtually wrapped about the portion 20 of the hose. Prior clamping plates have had the force applied to the middle portion of the clamping plate leaving the end portions of the clamping plate to flex and to be free of any force adapted to act against the hose. By virtue of the thin thickness of the plate 19, the same will be readily wrapped down over or flexed to conform to the circumference of the hose, and since the force is applied to the plate at the end portions thereof, the intermediate portion of the plate 19 will be tensioned over the hose circumference. The bridging element is preferably of thicker material than the plate but will flex also if necessary to accommodate the clamp to different hose diameters and to insure proper wrapping about the hose circumference.

It should thus now be apparent that there has been provided an arrangement whereby the second band or clamping plate will have a bandular clamping action upon the hose the same as will have the primary band. Both of the clamping bands are consequently put in tension.

The bridging element 21 has radially extending guide or flange portions 35 and 36 at opposite sides thereof. These projections 35 extend sufficiently to be longitudinally aligned with the spaced portion 15 of the primary band 14, at all adjustments of the bridging element within the spaced portion 15. By means of these projections 35, the plate 19 which is secured to the bridging element 21 is thus kept in alignment with the space portion 15 of the primary band 14. The projections 36 are arranged to be in alignment with faces of the nut 33, when the screw 29 is turned to move the bridging element 21 to its full extracted position. It should thus be apparent that with these projections the plate 19 is positively guided and retained within the band 14 at all times. Between adjacent projections 35 and 36 notched spaces 37 are found. The spaces are sufficiently deep as to be down to the base whereby the flexure of the bridging element, as related above, may occur.

While various changes may be made in the detailed construction of the invention, it shall be understood that such changes shall be made within the spirit and scope of the present invention as defined in the appended claims.

I claim as my invention:

1. In a hose clamp, a flexible band which is adapted to encompass a hose and conformably engage a circumferential portion thereof, an arcuate, flexible band section for conformably engaging a complementary circumferential portion of said hose, a bridge-piece having connections with spaced portions of said band section and spaced from the said band section between said connections, and adjustable means acting against said band and through the agency of said bridge-piece, band section and connections to cause said band and band section to engage and compress said hose substantially uniformly throughout its entire circumferential extent when said clamp is tightened by said means, said bridge-piece being yieldable so that the curvature of said band section may be caused to change as the latter compresses the engaged portion of said hose.

2. In a hose clamp, a flexible band which is adapted to encompass a hose and conformably engage a circumferential portion thereof, an arcuate, flexible band section for conformably engaging a complementary circumferential portion of said hose, a bridge-piece having connections with spaced portions of said band section and spaced from said band section between said connections, said band section and bridge-piece being located within said band between the latter and said hose, and adjustable means acting against said band and through the agency of said bridge-piece, band section and connections to cause said band and band section to engage and compress said hose substantially uniformly throughout its entire circumferential extent when said clamp is tightened by said means, said bridge-piece being yieldable so that the curvature of said band section may be caused to change as the latter compresses the engaged portion of said hose.

3. In a hose clamp, a flexible band which is adapted to encompass a hose and conformably engage a circumferential portion thereof, an arcuate, flexible band section for conformably engaging a complementary circumferential portion of said hose, a bridge-piece having connections with said band section adjacent the terminal portions thereof and being spaced from said band section between said connections, and a screw acting against said band and through the agency of said bridge-piece, band section and connections to cause said band and band section to engage and compress said hose substantially uniformly throughout its entire circumferential extent when said clamp is tightened by said screw, said bridge-piece being yieldable so that the curvature of said band section may be caused to change as the latter compresses the engaged portion of said hose.

4. In a hose clamp, a flexible band which is adapted to encompass a hose and conformably engage a circumferential portion thereof, an arcuate, flexible band section for conformably engaging a complementary circumferential portion of said hose, a bridge-piece having connections with said band section adjacent the terminal portions thereof and being spaced from said band section between said connections, and a screw having a connection with said bridge-piece substantially midway between said connections and acting against said band and through the agency of said bridge-piece, band section and connections to cause said band and band section to engage and compress said hose substantially uniformly throughout its entire circumferential extent when said clamp is tightened by said screw, said bridge-piece being yieldable so that the curvature of said band section may be caused to change as the latter compresses the engaged portion of said hose.

5. In a hose clamp, a flexible band which is adapted to encompass a hose and conformably engage a circumferential portion thereof, said band having angularly extending portions which form an arch, an arcuate, flexible band section for conformably engaging a complementary circumferential portion of said hose, a bridge-piece located under said arch and having angularly extending legs which are connected at their ends to the terminal portions of said band and which converge from said connections to a junction which is spaced from said band section, and a screw having connections with said arch and bridge-piece and acting against said band and through the agency of said bridge-piece, band section and connections to cause said band and band section to engage and compress said hose substantially uniformly throughout its entire circumferential extent when said clamp is tightened by said screw, said bridge-piece being yieldable so that the curvature of said band section may be caused to change as the latter compresses the engaged portion of said hose.

6. In a hose clamp, a flexible band adapted to encompass a hose and to conformably engage a circumferential portion thereof, an arcuate, flexible band section for conformably engaging a complementary circumferential portion of said hose, a bridge-piece having connections with the said band section adjacent the terminal portions thereof and spaced from said band section between said connections, said bridge-piece having marginal flanges which overlie opposite sides of said band to provide guides, and means acting against said band and through the agency of said bridge-piece, band section and connections for causing said band and band section to engage and compress said hose substantially uniformly throughout its entire circumferential extent, said flanges being notched to render said bridge-piece yieldable so that the curvature of said band section may be caused to change as the latter compresses the engaged portion of said hose.

7. A hose clamp of the type having a flexible tension band adapted to encircle the hose and a tightening nut secured to the ends of the band, a bridge, and a screw threaded through the nut and having a thrust engagement with the center of the bridge, said bridge comprising an outer rigid member of inverted substantially V-shape to which the inner end of the screw is swivelled, and an inner arcuate flexible member having its intermediate portion spaced from the intermediate portion of the outer rigid bridge member, the ends of said outer rigid bridge member being fixed to the inner bridge member at points adjacent but inwardly of its free ends.

8. A hose clamp of the type having a flexible tension band adapted to encircle the hose and a tightening nut secured to the ends of the band, a bridge, and a screw threaded through the nut and having a thrust engagement with the center of the bridge, said bridge comprising an outer rigid member of inverted substantially V-shape to which the inner end of the screw is swivelled, and an inner arcuate flexible member having its intermediate portion spaced from the intermediate portion of the outer rigid bridge member, the ends of said outer rigid bridge member being fixed to the inner bridge member at points adjacent but inwardly of its free ends, said inner bridge member being of a length to extend well toward the sides of the hose and to be thrust by the rigid bridge member between the hose and adjacent saide portions of the tension band when the screw is tightened.

9. A hose clamp of the type having a flexible tension band adapted to encircle the hose and a tightening nut at the ends of the band, a bridge, and a screw threaded through the nut and having thrust engagement with the bridge, in which the bridge comprises an outer thrust transmitting bridge member and an inner flexible arcuate bridge member, said inner flexible bridge member having its intermediate portion spaced from the intermediate portion of the outer bridge member, and said outer bridge member having thrust engagement at said intermediate portion thereof with the screw and connection for thrust transmission at its end portions with the inner flexible bridge member at the ends of said intermediate portion of said inner flexible bridge member for placing said intermediate portion of the inner flexible bridge member in tension when the clamp is tightened.

CHARLES E. HATHORN.